US012585460B2

(12) United States Patent
Rohleder et al.

(10) Patent No.: US 12,585,460 B2
(45) Date of Patent: Mar. 24, 2026

(54) SOFTWARE OBFUSCATION METHOD USING AN OPAQUE PREDICATE BASED ON MULTIPLYING MIXED BOOLEAN-ARITHMETIC EXPRESSIONS

(71) Applicant: THALES DIS CPL USA, INC., Austin, TX (US)

(72) Inventors: Roman Rohleder, Augsburg (DE); Peter Garba, Munich (DE)

(73) Assignee: THALES DIS CPL USA, Inc., Austin, TX (US)

( * ) Notice: Subject to any disclaimer, the term of this patent is extended or adjusted under 35 U.S.C. 154(b) by 315 days.

(21) Appl. No.: 18/262,401

(22) PCT Filed: Jan. 25, 2022

(86) PCT No.: PCT/US2022/013584
§ 371 (c)(1),
(2) Date: Jul. 21, 2023

(87) PCT Pub. No.: WO2022/159851
PCT Pub. Date: Jul. 28, 2022

(65) Prior Publication Data
US 2024/0111845 A1 Apr. 4, 2024

(30) Foreign Application Priority Data
Jan. 25, 2021 (EP) ..................................... 21153335

(51) Int. Cl.
G06F 8/70 (2018.01)
G06F 9/30 (2018.01)
G06F 21/14 (2013.01)

(52) U.S. Cl.
CPC .............. *G06F 8/70* (2013.01); *G06F 9/3001* (2013.01); *G06F 9/30058* (2013.01); *G06F 21/14* (2013.01)

(58) Field of Classification Search
None
See application file for complete search history.

(56) References Cited

U.S. PATENT DOCUMENTS

| | | | | |
|---|---|---|---|---|
| 2004/0103404 A1* | 5/2004 | Naumovich | .......... | G06F 9/4492 717/136 |
| 2005/0183072 A1* | 8/2005 | Horning | .................. | G06F 21/10 717/140 |
| 2008/0208560 A1* | 8/2008 | Johnson | .................. | G06F 21/14 703/22 |

(Continued)

OTHER PUBLICATIONS

Eyrolles, Ninon, "Obfuscation with Mixed Boolean-Arithmetic Expressions: reconstruction, analysis and simplification tools," Oct. 25, 2017, p. 1-125. (Year: 2017).*

(Continued)

*Primary Examiner* — Qing Chen

(57) ABSTRACT

Provided is a program and computer-implemented method of obfuscating a software code, comprising adding a conditional branch instruction to the software code which, when executed, causes evaluating an opaque predicate (PT, PF, P?). The method comprises a step of generating the opaque predicate which includes performing a multiplication operation having as operands two mixed Boolean-arithmetic expressions. Other embodiments disclosed.

8 Claims, 2 Drawing Sheets

(56) References Cited

U.S. PATENT DOCUMENTS

| | | | | |
|---|---|---|---|---|
| 2008/0216051 A1* | 9/2008 | Johnson | ................. | H04L 9/002 |
| | | | | 717/110 |
| 2010/0199354 A1* | 8/2010 | Eker | ....................... | G06F 21/14 |
| | | | | 726/26 |
| 2015/0074803 A1* | 3/2015 | Johnson | ............... | G06F 21/125 |
| | | | | 726/22 |
| 2015/0213239 A1* | 7/2015 | Johnson | ............... | G06F 21/125 |
| | | | | 726/26 |
| 2016/0239647 A1* | 8/2016 | Johnson | ............... | G06F 21/125 |
| 2016/0379131 A1* | 12/2016 | Teuwen | ................. | G06F 21/14 |
| | | | | 706/56 |

OTHER PUBLICATIONS

Blazy et al., "Formal Verification of a Program Obfuscation Based on Mixed Boolean-Arithmetic Expressions," 2019, p. 196-208. (Year: 2019).*

Zobernig et al., "When Are Opaque Predicates Useful?", 2019, p. 168-175. (Year: 2019).*

Van den Broeck et al., "Obfuscated integration of software protections," Mar. 18, 2020, p. 73-101. (Year: 2020).*

International Search Report (PCT/ISA/210) and Written Opinion (PCT/ISA/237) mailed on May 2, 2022, by the European Patent Office as the International Searching Authority for current International Application No. PCT/US2022/013584—[13 pages].

Peter Garba et al: "Saturn—Software Deobfuscation Framework Based on LLVM", arxiv.org, Cornell University Library, 201 Olin Library Cornell University Ithaca, NY 14853, Sep. 5, 2019 (Sep. 5, 2019), XP081473454, Sections 1, 5.3 2,11. Listing 2.

Biondi Fabrizio et al: "Effectiveness of synthesis in concolic deobfuscation", Computers & Security, Elsevier Science Publishers. Amsterdam, NL, vol. 70, Jul. 21, 2017 (Jul. 21, 2017), pp. 500-515, XP085176488, ISSN: 0167-4048, DOI: 10.1016/J.COSE.2017.07.006; Section 2.

Zhou Yongxin et al: "Information Hiding in Software with Mixed Boolean-Arithmetic Transforms" , Aug. 27, 2007 (Aug. 27, 2007), ICIAP: International Conference on Image Analysis and Processing, 17th International Conference, Naples, Italy, Sep. 9-13, 2013. Proceedings; [Lecture Notes in Computer Science; Lect.Notes Computer], Springer, Berlin, Heidelberg, pp. 61-75, XP047445537, ISBN: 978-3-642-17318-9, cited in the application Sections 3, 4.

* cited by examiner

SOFTWARE OBFUSCATION METHOD USING AN OPAQUE PREDICATE BASED ON MULTIPLYING MIXED BOOLEAN-ARITHMETIC EXPRESSIONS

FIELD

The field of the invention is that of obfuscation techniques for enhancing software security. More particularly, the invention relates to control flow obfuscation based on opaque predicates.

BACKGROUND

To protect intellectual property in software and/or enforce licensing, software obfuscation techniques are used to hinder attackers from extracting the intellectual property (algorithms, keys, . . . ) or circumventing license protections.

One obfuscating technique consists in altering the control flow of a program using an opaque predicate, i.e. a Boolean expression which value is known during obfuscation but is hard to compute for the analyst of the obfuscated program.

An opaque predicate is typically used to create a fake branch in the control flow graph of a function. The value of the opaque predicate being for instance always true, the branch corresponding to its evaluation to false will never be on any execution path and junk code (useless code) can be inserted and associated to this branch. Conversely, if the opaque predicate always evaluates to false, junk code is associated to the branch corresponding to its evaluation to true. Another similar way to use opaque predicates is to choose a predicate evaluating randomly to true or false, and execute the same code on the two conditional branches.

An opaque predicate may be based on a mixed Boolean-arithmetic equality of two expressions and obfuscating a software code may include adding a conditional branch instruction to the software code, the conditional branch instruction causing, when executed, evaluating the opaque predicate by checking equality (for instance in case of an always true predicate) or inequality (for instance in case of an always false predicate) of the two expressions and execution branching on one of a true and a false branch depending on whether said equality or inequality is respectively checked as true or false.

Despite such an obfuscation technique, attacks based on symbolic execution and its underlying SMT-solving software have shown promising results, hence threatening software integrity.

SUMMARY

Current obfuscation protections based on opaque predicates not being fully satisfactory, a need therefore exists for a more efficient protection against deobfuscation of softwares through the usage of symbolic execution.

In order to hinder deobfuscation by symbolic execution, the invention proposes a computer-implemented method of obfuscating a software code, comprising adding a conditional branch instruction to the software code which, when executed, causes evaluating an opaque predicate. The method comprises a step of generating the opaque predicate which includes performing a multiplication operation having as operands two mixed Boolean-arithmetic expressions.

Some preferred, although non-limitative embodiments of this method are as follows:

the conditional branch instruction causes, when executed, evaluating the opaque predicate by checking equality or inequality of a first term and a second term and execution branching on one of a true and a false branch depending on whether said equality or inequality is respectively checked as true or false, and the step of generating the opaque predicate comprises generating the first and the second term, wherein generating the first term includes performing a first multiplication operation having as operands a first expression of a first mixed Boolean-arithmetic equality of two expressions and a first expression of a second mixed Boolean-arithmetic equality of two expressions and wherein generating the second term includes performing a second multiplication operation having as operands a second expression of the first mixed Boolean-arithmetic equality of two expressions and a second expression of the second mixed Boolean-arithmetic equality of two expressions;

adding the conditional branch instruction comprises splitting a basic block of instructions of the software code into an upper block of instructions and a lower block of instructions, connecting the upper block to the conditional branch instruction and connecting the lower block of instructions to one of the true and false branches;

the opaque predicate is an opaque predicate always evaluating to true, wherein the lower block of instructions is connected to the true conditional branch, another basic block of instructions of the software code is connected to the false conditional branch and the conditional branch instruction causes, when executed, checking equality of the first term and the second term and execution branching on the true conditional branch;

the opaque predicate is an opaque predicate always evaluating to false, the lower block of instructions is connected to the false conditional branch, another basic block of instructions of the software code is connected to the true conditional branch and the conditional branch instruction causes, when the software code is executed, checking inequality of the first term and the second term and execution branching on the false conditional branch;

the opaque predicate is an opaque predicate evaluating randomly to true or false, the lower block of instructions is connected to one of the true and false conditional branches and a clone of the lower block of instructions is connected to the other one of the true and false conditional branches;

generating the first term comprises adding an additional expression to the result of multiplying;

generating the first term comprises removing a subexpression to the result of multiplying.

BRIEF DESCRIPTION OF THE DRAWINGS

Some aspects, goals, advantages and features of the invention will be better understood from reading the following detailed description of preferred embodiments thereof, given as a non-limitative example and made with reference to the accompanying figures, in which.

DETAILED DESCRIPTION

The invention relates to a computer-implemented method of obfuscating a software code which comprises adding a conditional branch instruction to the software code. The conditional branch instruction is generated so as to cause, when executed, evaluating an opaque predicate by checking equality or inequality of a first term and a second term and execution branching on one of a true and a false branch depending on whether said equality or inequality is respectively checked as true or false.

Figure 1:
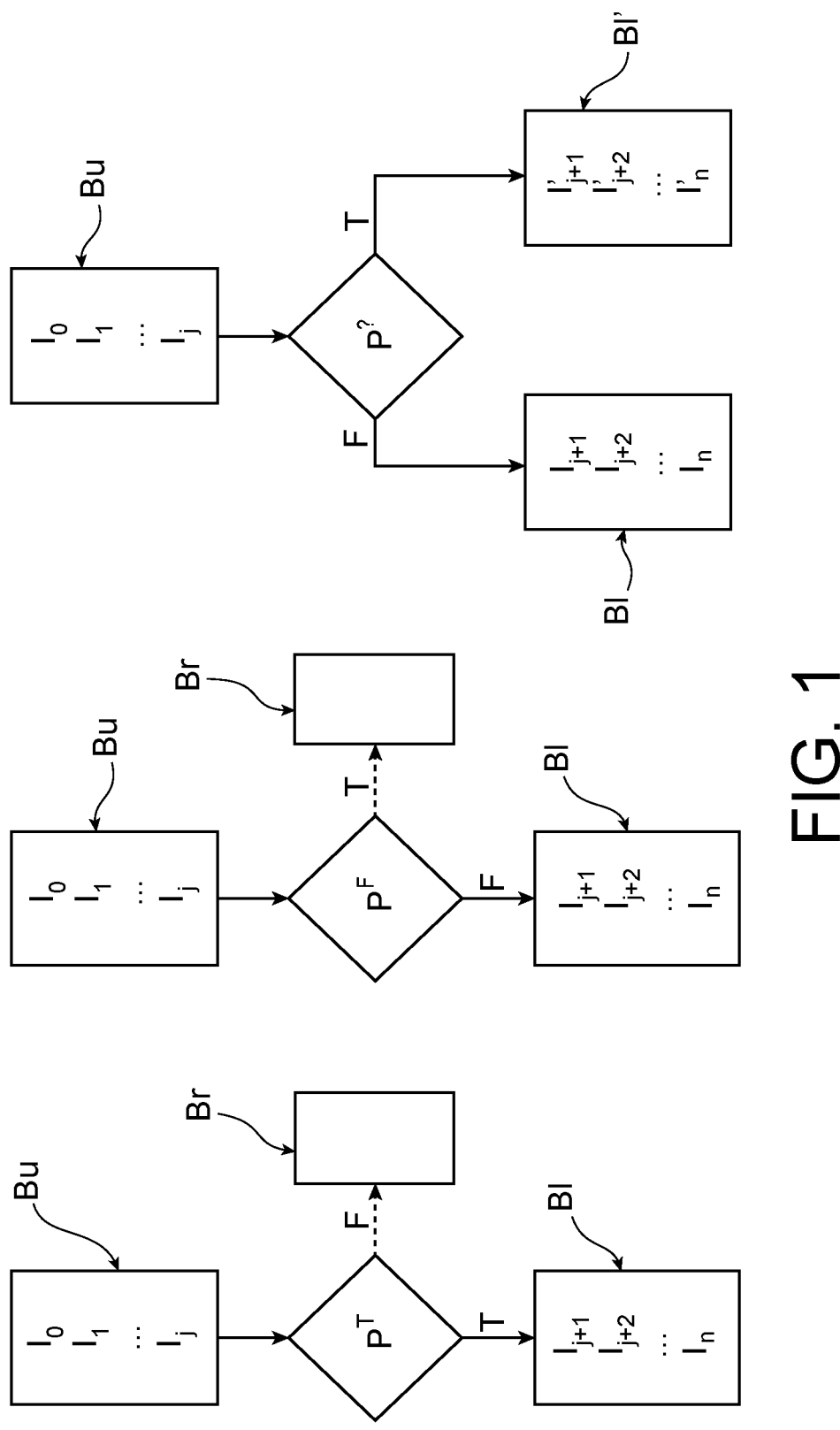
FIG. 1 shows the insertion of different types of opaque predicates within a software code in accordance with the invention.

In particular, with reference to FIG. 1, adding at obfuscation time the conditional branch instruction may comprise selecting a basic block, with at least two instructions $I_0$ . . . $I_n$ (n being an integer greater or equal to one), within a function, splitting the selected basic block of instructions of the software code into an upper block of instructions (instructions ranging from $I_0$ to $I_j$) and a lower block of instructions (instructions ranging from $I_{j+1}$ to $I_n$), connecting the upper block upstream the conditional branch instruction and connecting the lower block of instructions downstream one of the true and false branches.

As shown on FIG. 1, the opaque predicate may be an opaque predicate always evaluating to true $P^T$ and the conditional branch instruction causes, when executed, checking equality of the first term and the second term and execution branching on the true conditional branch T. In such a case, the upper block of instructions Bu is connected with the opaque predicate $P^T$ while the lower block of instructions Bl is connected to the true conditional branch T (this path will always be followed). Another basic block of instructions of the software code Br, for instance randomly selected, may be connected to the false conditional branch F.

As also shown on FIG. 1, the opaque predicate may be an opaque predicate always evaluating to false $P^F$ and the conditional branch instruction causes, when executed, checking inequality of the first term and the second term and execution branching on the false conditional branch F. In such a case, the upper block of instructions Bu is connected with the opaque predicate $P^T$ while the lower block of instructions Bl is connected to the false conditional branch F (this path will always be followed). Another basic block of instructions of the software code Br, for instance randomly selected, may be connected to the true conditional branch F.

And as also shown on FIG. 1, the opaque predicate may be an indifferent opaque predicate evaluating randomly to true or false $P^?$ and the conditional branch instruction causes, when executed, checking equality or inequality of the first term and the second term and execution branching on one of the true and false conditional branches. In such a case, the upper block of instructions Bu is connected with the opaque predicate $P^?$ while the lower block of instructions Bl is connected to one of the true and false conditional branches (for instance the false branch F). A clone Bl' of the lower block of instructions is connected to the other one of the true and false conditional branches (the true branch T in the example).

The obfuscating method according to the invention further comprises a step of generating the opaque predicate. This generation step creates an opaque predicate, which is specifically hard to be solved by symbolic execution and thereby hinder deobfuscation of software.

Indeed, this generation step includes performing a multiplication operation having as operands two mixed Boolean-arithmetic expressions and is therefore performed in a way that exploits an underlying principle of symbolic execution and more specifically SMT-solvers. To solve bitvector problems, SMT-solvers use a technique called bitblasting which breaks down word-level operations into bit-level. Bitblasting the multiplication operation creates especially large instances due to the nature of multiplications, where each bit or each number is multiplied with each other. This invention exploits this fact by creating opaque predicates based on a multiplication operation that uses as operands Mixed Boolean-Arithmetic (MBA) expressions. Besides being optimization resistant, multiplication-based mixed Boolean-arithmetic opaque predicates are, as shown below, especially hard to be solved by SMT-solvers. Indeed, the time required to solve such opaque predicates increases exponentially with the bitwidth of the operands.

The step of generating the opaque predicate may include generating the first and the second term of the opaque predicate and may start by generating or retrieving from a database two mixed boolean-arithmetic equalities of two expressions: MBA1_A==MBA1_B and MBA2_A==MBA2_B.

The article by Y. Zhou et al. "Information Hiding in Software with Mixed Boolean-Arithmetic Transforms", WISA'07: Proceedings of the 8th international conference on Information security applications, August 2007 Pages 61-75 explains how to generate mixed Boolean-arithmetic equalities. Already existing mixed Boolean-arithmetic equalities can be found for example in Appendix A and Appendix B of the thesis by Ninon Eyrolles "Obfuscation with Mixed Boolean-Arithmetic Expressions: reconstruction, analysis and simplification tools". Cryptography and Security [cs.CR]. Université Paris-Saclay, 2017.

Generating the first term of the opaque predicate then comprises a first multiplication operation having as operands a first expression of the first one of the two mixed Boolean-arithmetic equalities (for instance MBA1_A) and a first expression of the second one of the mixed Boolean-arithmetic equalities (for instance MBA2_A) while generating the second term then comprises a second multiplication operation having as operands a second expression of the first mixed Boolean-arithmetic equality (for instance MBA1_B) and a second expression of the second mixed Boolean-arithmetic equality of two expressions (for instance MBA2_B).

In an example, the first MBA equality is $(3*(x\&\~y))==(2*(x^\~y)+(\~y)+(x|\~y)-2*(\~x)-x)$, where $(3*(x\&\~y))$ is a first expression called MBA1_A, $(2*(x^\~y)+(\~y)+(x|\~y)-2*(\~x)-x)$ is a second expression called MBA1_B and x and y are some dangling local or global variables of the function.

In this example, the second MBA equality is $(-(x|y))==((\~x\&y)+2*(\~(x|y))-2*(\~x)-x)$, where $(-(x|y))$ is a first expression called MBA2_A and $((\~x\&y)+2*(\~(x|y))-2*(\~x)-x)$ is a second expression called MBA2_B.

Trying to solve MBA1_A==MBA1_B or MBA2_A==MBA2_B directly using an SMT-solver is very quick so that an opaque predicate based on a mixed Boolean-arithmetic equality can hence be broken. The invention provides a more efficient protection against deobfuscation by complicating the opaque predicate so as to stress the internal bitblasting algorithm within a SMT-solver. To do so, the corresponding halves of the two MBA equalities are multiplied (MBA1_A*MBA2_A and MBA1_B*MBA2_B) to allow generating multiplication-based MBA opaque predicates.

Figure 2:
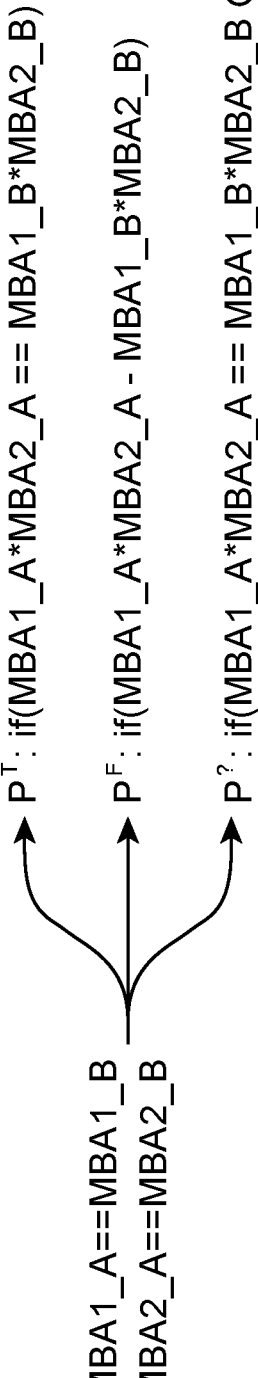
FIG. 2 illustrates the generation process of different opaque predicates that may be used in the method according to the invention.

As illustrated on FIG. 2, the results of these multiplications can be used to create an always true opaque predicate $P^T$ by constructing the conditional branch instruction as the following if-statement:

```
if(MBA1_A * MBA2_A == MBA1_B * MBA2_B){
    // This part of the code is always executed
    // Lower block of split basic block is connected here
}else {
    // This part of the code is never executed
    // A random other basic block is connected here
}
```

Alternatively, the results of these multiplications can be used to create an always false opaque predicate $P^F$ by constructing the conditional branch instruction as the following if-statement:

```
if(MBA1_A * MBA2_A – MBA1_B * MBA2_B){
    // This part of the code is never executed
    // A random other basic block is connected here
}else {
    // This part of the code is always executed
    // Lower block of split basic block is connected here
}
```

Still alternatively, the results of these multiplications can be used to create an indifferent opaque predicate $P^?$ evaluating randomly to true or false by randomly adding new terms on only one side of the equality MBA1_A*MBA2_A==MBA1_B*MBA2_B or randomly removing sub-expressions on only one side of this equality. In this respect, generating the first term may comprise adding an additional expression to the result of the first multiplication or may comprise removing a sub-expression from this result of the first multiplication. For instance, an indifferent opaque predicate $P^?$ is created by constructing the conditional branch instruction as the following if-statement:

```
if(MBA1_A * MBA2_A == MBA1_B * MBA2_B⊙x){
    // Clone of Lower block of split basic block is connected here
}else {
    // Lower block of split basic block is connected here
}
```

It will be understood that the invention is not limited to the use of two mixed Boolean-arithmetic equalities but can be easily extended to a larger number of mixed Boolean-arithmetic equalities. In addition, the invention is not limited to generating the above equations based on the two multiplications MBA1_A*MBA2_A and MBA1_B*MBA2_B but also extends to diversifying the equations to further obfuscate, for instance by adding random other terms on both sides (for instance add+1 on both sides) or by iteratively applying MBA-substitutions.

In addition, the invention is not limited to the above-described obfuscation method but also extends to a computer program comprising instructions which, when the program is executed by a computer, cause the computer to carry out this obfuscation method as well as to a data processing system on which the computer program can be run. The computer program can be loaded into memory, transmitted over a network or distributed on a data carrier. The data processing system provides generic data processing means, can be embedded in a personal computer for instance and includes a processor configured to perform this obfuscation method in addition to a memory and inputs-outputs.

The invention also extends to the obfuscated code, that is to an obfuscated computer program comprising a conditional branch instruction which, when executed, causes evaluating an opaque predicate by checking equality or inequality of a first term and a second term and execution branching on one of a true and a false branch depending on whether said equality or inequality is respectively checked as true or false. The first term is based on multiplying a first expression of a first mixed Boolean-arithmetic equality of two expressions with a first expression of a second mixed Boolean-arithmetic equality of two expressions and the second term is based on multiplying a second expression of the first mixed-Boolean arithmetic equality of two expressions with a second expression of the second mixed-Boolean arithmetic equality of two expressions.

Efficiency of the following multiplication-based opaque predicate, protected with mixed-Boolean arithmetic (it is equivalent to x*y==x*y and always true), has been evaluated: $((-\tilde{}x-1)*((x-(x|\tilde{}y)+(\tilde{}x|y)))==(((x|y)+(\tilde{}x\&y)+(\tilde{}(x\hat{}y))+1)*(2*(x\&\tilde{}y)+(\tilde{}x|y)-(\tilde{}(x\&y))))$.

First, generation of this predicate is simple as it involves no loops or otherwise complex operations but merely 9 additions/subtractions, 16 Boolean operations and 2 multiplications. Then, the solving time of this predicate by means of the KLEE symbolic execution framework and the Z3 and the STP SMT-Solvers was evaluated as follows:

8-bit bitwidth for x and y: 0 m2,375 s
10-bit bitwidth for x and y: 1 m11,573 s
12-bit bitwidth for x and y: 63 m58,361 s
14-bit bitwidth for x and y:—aborted As can be observed, the solving time increases exponentially with increasing bitwidth. In practice, opaque predicates with 32 or 64 bit could be used for increased protection and architecture optimization.

As discussed above, the invention uses multiplication-based mixed Boolean arithmetic opaque predicates with the benefit of stressing symbolic execution engines (the bitblasting process of the underlying SMT-solver to be more precise) and providing stronger software protection. The invention hinders automatic deobfuscation by symbolic execution, constraining attackers to invest more time and effort into alternative approaches like code synthesis, prolonging the time the protected program remains uncracked on the market and hence increase revenue.

The invention claimed is:

1. A computer-implemented method, performed by a data processing system comprising a processor, of obfuscating a software code for protecting execution of the software code against automatic de-obfuscation by symbolic execution, comprising adding, by the processor, a conditional branch instruction to the software code which, during execution of the software code, causes evaluating an opaque predicate ($P^T$, $P^F$, $P^?$), comprising generating, by the processor, the opaque predicate ($P^T$, $P^F$, $P^?$) which includes performing a multiplication operation having as operands two mixed Boolean-arithmetic expressions to alter an execution flow of the software code, wherein the conditional branch instruction causes, during execution of the software code, evaluating the opaque predicate ($P^T$, $P^F$, $P^?$) by checking equality or inequality of a first term and a second term and execution branching on one of a true branch and a false branch depending on whether the equality or inequality is respectively checked as true or false, wherein generating the opaque predicate ($P^T$, $P^F$, $P^?$) comprises generating the first term and the second term, wherein generating the first term includes performing a first multiplication operation having as operands a first expression (MBA1_A) of a first mixed Boolean-arithmetic equality of two expressions and a first expression (MBA2_A) of a second mixed Boolean-arithmetic equality of two expressions, and wherein generating the second term includes performing a second multiplication operation having as operands a second expression (MBA1_B) of the first mixed Boolean-arithmetic equality of two expressions and a second expression (MBA2_B) of the second mixed Boolean-arithmetic equality of two expressions.

2. The computer-implemented method of claim 1, wherein adding the conditional branch instruction to the software code comprises splitting a basic block of instructions of the software code into an upper block of instructions (Bu) and a lower block of instructions (Bl), connecting the upper block of instructions (Bu) of the software code to the conditional branch instruction and connecting the lower block of instructions (Bl) of the software code to one of the true and false branches.

3. The computer-implemented method of claim 2, wherein the opaque predicate ($P^T$, $P^F$, $P^?$) is an opaque predicate always evaluating to true ($P^T$), wherein the lower block of instructions (Bl) of the software code is connected to the true branch, wherein another basic block of instructions (Br) of the software code is connected to the false branch, and wherein the conditional branch instruction causes, when the software code is executed, checking equality of the first term and the second term and execution branching on the true branch.

4. The computer-implemented method of claim 2, wherein the opaque predicate ($P^T$, $P^F$, $P^?$) is an opaque predicate always evaluating to false ($P^F$), wherein the lower block of instructions (Bl) of the software code is connected to the false branch, wherein another basic block of instructions (Br) of the software code is connected to the true branch, and wherein the conditional branch instruction causes, when the software code is executed, checking inequality of the first term and the second term and execution branching on the false branch.

5. The computer-implemented method of claim 2, wherein the opaque predicate ($P^T$, $P^F$, $P^?$) is an opaque predicate evaluating randomly to true or false ($P^?$), wherein the lower block of instructions (Bl) of the software code is connected to one of the true and false branches, and wherein a clone (Bl') of the lower block of instructions (Bl) of the software code is connected to another one of the true and false branches.

6. The computer-implemented method of claim 5, wherein generating the first term comprises adding an additional expression to a result of multiplying.

7. The computer-implemented method of claim 5, wherein generating the first term comprises removing a sub-expression to a result of multiplying.

8. An obfuscated computer program comprising a conditional branch instruction added in software code stored in a non-transitory computer-readable medium to obfuscate the software code for protecting execution of the software code against automatic de-obfuscation by symbolic execution, which, during execution of the software code by a processor, causes evaluating an opaque predicate ($P^T$, $P^F$, $P^?$), comprising generating, by the processor, the opaque predicate ($P^T$, $P^F$, $P^?$) which includes performing a multiplication operation having as operands two mixed Boolean-arithmetic expressions to alter an execution flow of the software code, wherein the conditional branch instruction causes, during execution of the software code, evaluating the opaque predicate ($P^T$, $P^F$, $P^?$) by checking equality or inequality of a first term and a second term and execution branching on one of a true branch and a false branch depending on whether the equality or inequality is respectively checked as true or false, wherein the first term is based on multiplying a first expression (MBA1_A) of a first mixed Boolean-arithmetic equality of two expressions with a first expression (MBA2_A) of a second mixed Boolean-arithmetic equality of two expressions, and wherein the second term is based on multiplying a second expression (MBA1_B) of the first mixed Boolean-arithmetic equality of two expressions with a second expression (MBA2_B) of the second mixed Boolean-arithmetic equality of two expressions.

* * * * *